(12) United States Patent
Schubert et al.

(10) Patent No.: US 8,845,772 B2
(45) Date of Patent: Sep. 30, 2014

(54) PROCESS AND SYSTEM FOR SYNGAS PRODUCTION FROM BIOMASS MATERIALS

(75) Inventors: Peter J. Schubert, Naperville, IL (US); Charles Ogborn, Aurora, IL (US)

(73) Assignee: Peter J. Schubert, Indianapolis, IN (US)

( * ) Notice: Subject to any disclaimer, the term of this patent is extended or adjusted under 35 U.S.C. 154(b) by 754 days.

(21) Appl. No.: 12/357,788

(22) Filed: Jan. 22, 2009

(65) Prior Publication Data

US 2009/0183430 A1 Jul. 23, 2009

Related U.S. Application Data

(60) Provisional application No. 61/006,583, filed on Jan. 23, 2008.

(51) Int. Cl.
| | |
|---|---|
| *C10J 3/46* | (2006.01) |
| *C10J 3/54* | (2006.01) |
| *C01B 3/24* | (2006.01) |
| *C10J 3/18* | (2006.01) |
| *C10J 3/34* | (2006.01) |
| *C10J 3/10* | (2006.01) |
| *C10J 3/04* | (2006.01) |

(52) U.S. Cl.
CPC ............ *C10J 3/04* (2013.01); *C10J 2300/0903* (2013.01); *C10J 3/18* (2013.01); *C10J 3/34* (2013.01); *C10J 2300/0916* (2013.01); *C10J 2300/1238* (2013.01); *C10J 3/10* (2013.01); *C10J 2200/154* (2013.01)

USPC .......................... 48/197 R; 423/644; 423/650

(58) Field of Classification Search
USPC ................... 48/61, 197 R, 210; 423/644, 650
See application file for complete search history.

(56) References Cited

U.S. PATENT DOCUMENTS

| | | | | |
|---|---|---|---|---|
| 5,104,490 | A | * | 4/1992 | Brinkman et al. ............... 202/99 |
| 5,225,044 | A | * | 7/1993 | Breu ............................. 202/113 |
| 6,648,932 | B1 | | 11/2003 | Maton |
| 2004/0182003 | A1 | * | 9/2004 | Bayle et al. ..................... 48/210 |
| 2007/0214719 | A1 | | 9/2007 | Yoshikawa |

FOREIGN PATENT DOCUMENTS

KR 20040022642 3/2004

* cited by examiner

*Primary Examiner* — Matthew Merkling
(74) *Attorney, Agent, or Firm* — Hartman Global IP Law; Gary M. Hartman; Domenica N. S. Hartman

(57) ABSTRACT

A process and system suitable for producing syngas from biomass materials. The process and system entail the compaction of a loose biomass material to remove air therefrom and form a compacted biomass material. The compacted biomass material is then introduced into a reactor and heated in the substantial absence of air so as not to combust the compacted biomass material. Instead, the compacted biomass material is heated to a temperature at which organic molecules within the compacted biomass material break down to form ash and gases comprising carbon monoxide and hydrogen gas. Thereafter, the carbon monoxide and hydrogen gas are released from the reactor, and the ash is removed from the reactor.

19 Claims, 3 Drawing Sheets

Distance Along Reactor Vessel

PROCESS AND SYSTEM FOR SYNGAS PRODUCTION FROM BIOMASS MATERIALS

CROSS REFERENCE TO RELATED APPLICATIONS

This application claims the benefit of U.S. Provisional Application No. 61/006,583, filed Jan. 23, 2008, the contents of which are incorporated herein by reference.

BACKGROUND OF THE INVENTION

The present invention generally relates to the conversion of organic cellulosic material (biomass) into a useful gas-phase fuel. More particularly, this invention relates to a system and process for quasi-continuous conversion of biomass into synthesis gas (syngas) and suitable for use in small- to medium-scale applications, such as agricultural operations (farms), factories which use biomass as a starting material (paper mills, ethanol plants), and other facilities in which conventional syngas-generating apparatuses and processes would not likely be economical practical.

Biomass gasification is a well-known process for producing synthesis gas (syngas), which as also known in the art is a gas mixture containing varying amounts of carbon monoxide (CO) and hydrogen gas ($H_2$). Though having a lower energy density than natural gas, syngas is suitable for use as a fuel source.

Within a biomass gasifier, a carbonaceous material typically undergoes pyrolysis, during which the carbonaceous material is heated to release volatiles and produce char. Combustion then occurs during which the volatiles and char react with oxygen to form carbon dioxide ($CO_2$) according to the reaction $$C + O_2 \rightarrow CO_2$$

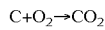

The next process is the gasification process, during which the char reacts with carbon dioxide and steam ($H_2O$) to produce carbon monoxide and hydrogen gas via the reaction $$C + H_2O \rightarrow H_2 + CO$$

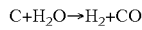

Consequently, the biomass gasification process employs oxygen or air to combust some of the biomass and produce carbon monoxide and energy, the latter of which is utilized to convert the remaining biomass to hydrogen and additional carbon monoxide.

Various types of gasifier designs are known. The most common type of gasifier used in biomass gasification is believed to be an up-draft design (counter-current) design, in which air, oxygen and/or steam flows upward through a permeable bed of biomass and counter-currently to the flow of ash and other byproducts of the reaction. Typical up-draft gasifiers have significant technical shortcomings. First, the introduction of air into the hot gasification chamber partly combusts the biomass, yielding a lower overall heating value compared to pure gasification. Second, if air is used as the gasification agent, nitrogen in the air is a diluent that reduces the energy content per unit volume of the output gas, making the output gas inconvenient for use in gas turbines, for storage, and for subsequent chemical processing. Third, tars and phenolic hydrocarbons produced in an up-draft gasifier require removal to reduce emissions, avoid fouling of a gas turbine, and avoid catalyst poisoning when used to create liquid fuels. The removal equipment adds to system complexity and size, with the result that for economic reasons the gasifier is usually limited to large installations. Because biomass is a low-energy content fuel and is dispersed geographically, a large-scale gasifier requires transport and storage of the biomass, which negatively affects the economic payback for the system.

In view of the above, there is a need for a biomass gasification equipment capable of economically practical use on medium- to small-scale installations, including direct sources of biomass such as agricultural operations (for example, farms), factories in which biomass materials are starting materials and/or byproducts (for example, paper mills, ethanol plants, etc.), sylvans, bioplants, and small towns and villages.

BRIEF DESCRIPTION OF THE INVENTION

The present invention provides a process and system suitable for producing syngas from biomass materials. The process and system are particularly-well suited for economical use in medium- to small-scale installations in which the use of conventional syngas-generating apparatuses and processes has not been economical practical.

According to a first aspect of the invention, the process includes compacting a loose biomass material to remove air therefrom and form a compacted biomass material, introducing the compacted biomass material into a reactor, and then heating the compacted biomass material within the reactor in the substantial absence of air so as not to combust the compacted biomass material. Instead, the compacted biomass material is heated to a temperature at which organic molecules within the compacted biomass material break down to form ash and gases comprising carbon monoxide and hydrogen gas. Thereafter, the carbon monoxide and hydrogen gas are released from the reactor, and the ash is removed from the reactor.

According to a second aspect of the invention, the system includes a reactor, means for compacting a loose biomass material to remove air therefrom and form a compacted biomass material, means for introducing the compacted biomass material into the reactor, and means for heating the compacted biomass material within the reactor to a temperature at which organic molecules within the compacted biomass material break down to form ash and gases that predominantly comprise carbon monoxide and hydrogen gas. The system further includes means for achieving a substantial absence of air within the reactor so as not to combust the compacted biomass material when heated by the heating means. Finally, the system includes means for releasing the carbon monoxide and hydrogen gas from the reactor, and means for removing the ash from the reactor.

A significant advantage of this invention is that syngas can be produced within the reactor using a substantially continuous process that does not cause any intentional combustion of the biomass material, and instead pyrolyzes the biomass material to promote the formation of hydrogen and carbon monoxide gases directly from the biomass material. Furthermore, the system and process preferably promote the formation of hydrogen and carbon monoxide gases from any higher molecular weight hydrocarbons within the biomass material or generated during heating of the biomass material.

As examples of particular aspects of the invention, the loose biomass material can be loaded into a hopper and gradually delivered to a reciprocating ram that provides the compaction of the material, as well as removes much of the air from the material prior to being introduced into the reactor. The biomass is preferably indirectly heated within the reactor to a temperature at which organic molecules of the biomass material break down into their simplest form: syngas and a mineral ash. The rapid pyrolysis preferably achieved by the system and process of this invention is capable of producing a clean syngas that is substantially free of aromatic hydrocarbons and alkanes that must be removed from syngas produced by lower-temperature gasifiers.

The system is energetically efficient for use on medium- to small-scale installations, including direct sources of biomass such as stover (the leaves and stalks of corn, sorghum and soybean plants that are left in a field after harvest) of agricultural operations and the starting materials, waste materials, and byproducts of factories, sylvans, bioplants, and small municipalities. Furthermore, the system can be of modest size, easily transported, and simple to operate, yet be effective in reducing the need for imported petroleum and reducing the carbon footprint of a farm, sylvan, industrial operation, or municipality. As an example, the system can be economically employed on a grain farm of six hundred acres, which is sufficiently large to produce significant amounts of stover and other biomass material, yet not so large as to render the transportation of biomass material burdensome. If burned in a turbine-generator, syngas produced from stover and other crop wastes can generate more electrical energy than needed by a typical small- to medium-sized farm in a year's time. Finally, the ash produced by the system and process of this invention is dry and pure, and contains essential plant nutrients that can be readily returned to the fields for nourishing subsequent plantings.

Other aspects and advantages of this invention will be better appreciated from the following detailed description.

DETAILED DESCRIPTION OF THE INVENTION

Figure 1:
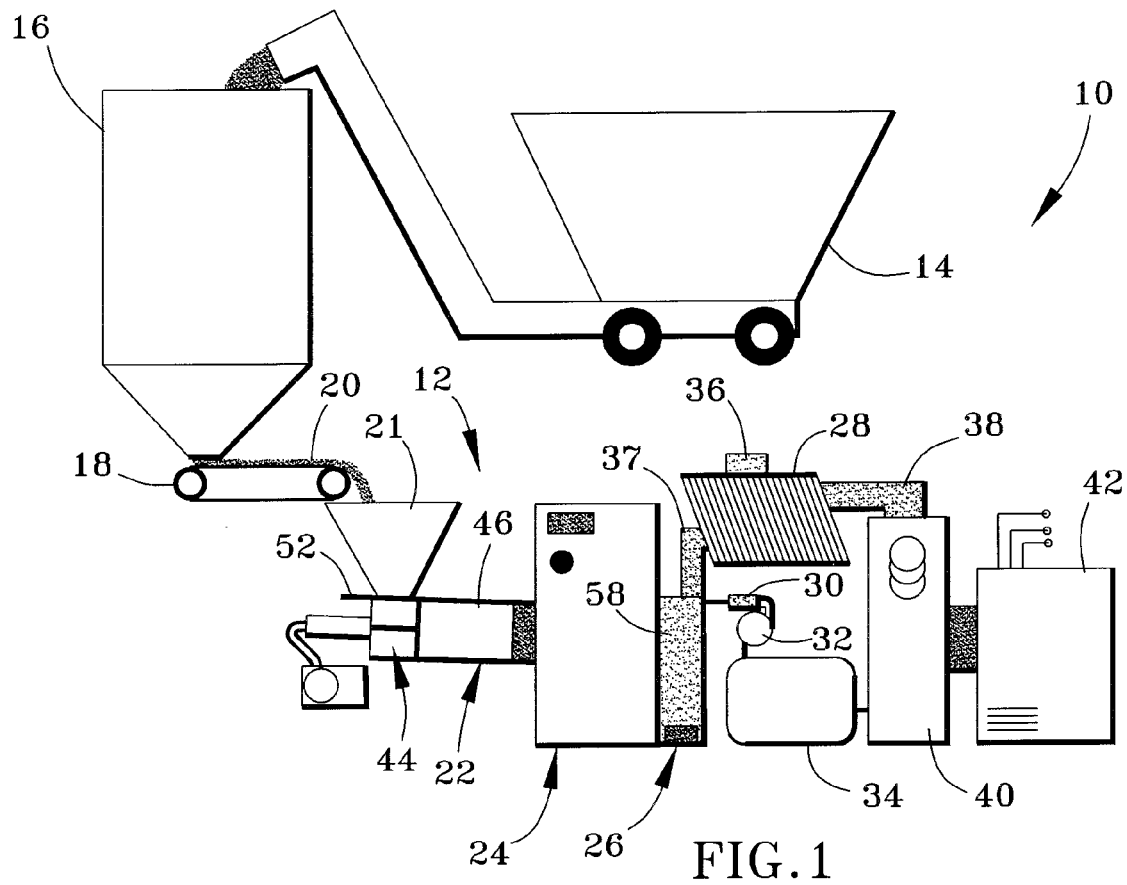
FIG. 1 is a schematic representation of an energy generation system that includes a biomass gasification apparatus in accordance with an embodiment of this invention.

FIG. 1 schematically represents an energy generation system 10 for generating syngas from organic materials, with biomass materials being of particular interest to the invention. The system 10 includes a gasification apparatus 12 comprising a biomass compaction unit 22, a reactor unit 24, and an ash removal unit 26 that are preferably configured to process biomass and produce syngas in a quasi-continuous process. The system 10 is further represented as utilizing the syngas to generate heat and electric power.

Gasification of biomass material delivered by the compaction unit 22 is performed within the reactor unit 24. According to a preferred aspect of the invention, the gasification process within the reactor unit 24 occurs in an atmosphere containing minimal air, and in such an oxygen-starved environment the biomass material is subjected to a temperature that is sufficiently high so that complex organic molecules are broken down (pyrolyzed) instead of combusted. As will be discussed in further detail below, in the absence of oxygen bulk combustion of the biomass is avoided, enabling the biomass to be directly converted to syngas, which as used herein refers to a gas mixture that predominantly comprises molecular hydrogen ($H_2$) and carbon monoxide (CO). The low-air atmosphere in which the gasification process is performed also has the advantage of minimizing the presence of nitrogen, which is an undesired diluent in syngas. Though the exact chemistry of syngas produced by the pyrolysis process will depend on the particular biomass feedstock, the pyrolysis reaction can be generically represented by the following equation:

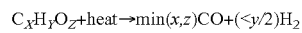

$$C_XH_YO_Z + \text{heat} \rightarrow \min(x,z)CO + (<y/2)H_2$$

In addition to carbon monoxide and hydrogen gas, this reaction may further produce limited amounts of water vapor ($H_2O$), carbon dioxide ($CO_2$) and other gases. Further aspects of the pyrolysis process of this invention will be discussed in greater detail below.

In order to be suitable for use on small- to medium-scale facilities, including farms, the system 10 is intended to be compact, safe and easy to operate, and economically profitable. The system 10 represented in FIG. 1 is illustrative of a farm application, and the following discussion will primarily focus on the implementation of the invention in a farm setting, though it will be understood that the invention is not limited to any particular installation.

In the example of FIG. 1, field waste (stover) such as corn stalks, bean shells, grain straw, etc., can be gathered after grain harvesting and transported with a trailer 14 to a holding bin 16. If desired or necessary, the biomass material can be reduced in size with, for example, a silage chopper, forage harvester, hammermill, or knife chopper, so that the biomass material is unconsolidated and sufficiently free-flowing for subsequent compaction within the compaction unit 22. In any event, compared with the many transportation and processing links and long distances that often exist between raw resources and conventional energy production facilities, from FIG. 1 it is evident that the system 10 is intended to produce energy from locally-grown or locally-available biomass materials in a simple, convenient, and environmentally-friendly manner.

Figure 2:
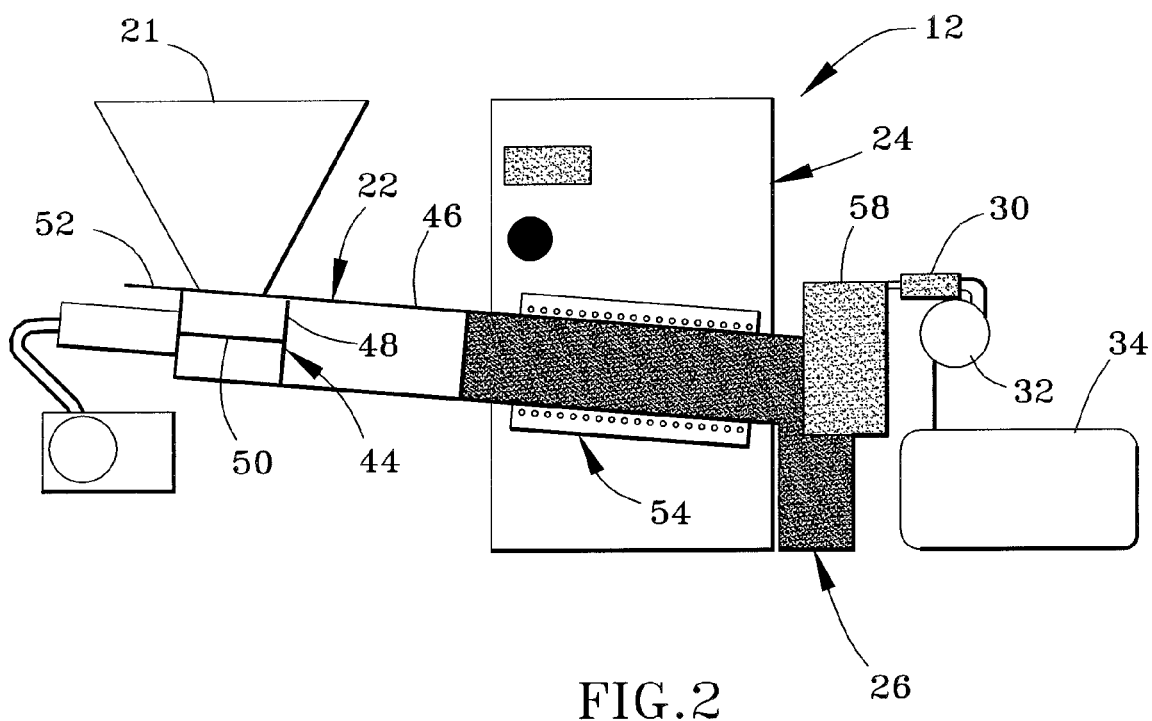
FIG. 2 is a more detailed view of the biomass gasification apparatus of FIG. 1.

FIG. 1 depicts loose biomass material 20 as being delivered with a conveyor 18 from the base of the holding bin 16 to a hopper 21 positioned above the compaction unit 22, which as shown in FIGS. 1 and 2 comprises a reciprocating ram 44 within a feeder chute 46. While the ram 44 is retracted, the loose biomass material 20 is dropped into the chute 46, for example, under the effect of gravity and optionally with the assistance of a shaker or a vertical ram (not shown). The reciprocating ram 44 is then actuated (for example, with a cylinder as shown in FIGS. 1 and 2) to force the biomass material 20 through the chute 46 in a manner that both compacts the biomass material 20 and removes most of the air from the biomass material 20. The pusher plate 48 of the ram 44 may be perforated to promote the removal of air from the biomass material 20 during compaction. As the ram 44 travels forward to push the biomass material 20 into the reactor unit 24, a guard 52 fixed to the pusher plate 48 of the ram 44 serves to cover an aperture in the chute 46 through which the biomass material 20 entered the chute 46 from the hopper 21.

The chute 46 feeds the compacted biomass material 20 into the reactor unit 24, and more particularly into a reactor chamber 56 within a reactor vessel 54 (FIGS. 2 and 3) of the reactor unit 24, where the biomass material 20 is rapidly heated to a temperature at which organic molecules break down into their simplest forms: syngas and a mineral ash. FIGS. 1 and 2 depict the use of a pump 32 to draw the syngas from the reactor unit 24 and through a filtration unit 30, which may comprise one or more filters, electrostatic precipitators, dust collectors, etc. Multiple parallel filtration paths may be provided between the reactor unit 24 and pump 32 so that individual filtration devices can be accessed for replacement or maintenance while the system 10 remains in operation. The pump 32 pressurizes the syngas and delivers it to a storage tank 34. In the embodiment represented in FIG. 1, the compressed syngas within the tank 34 is delivered to a combustion apparatus 40, such as a gas turbine or internal combustion engine, where the syngas is combusted to drive an electrical generator 42. Gaseous byproducts of the reactor unit 24 and combustion apparatus 40 can be routed through ducts 37 and 38, respectively, to a heat exchanger 28, which extracts useful heat from these byproducts before being released to the atmosphere through an exhaust 36. The gaseous byproducts are largely water vapor and carbon dioxide, and the carbon released to the atmosphere is the same carbon absorbed during the previous growing season from plant inspiration of carbon dioxide. Thus, no new carbon is introduced into the biosphere, but instead carbon is reused in a continuous cycle as nature intended.

Figure 3:
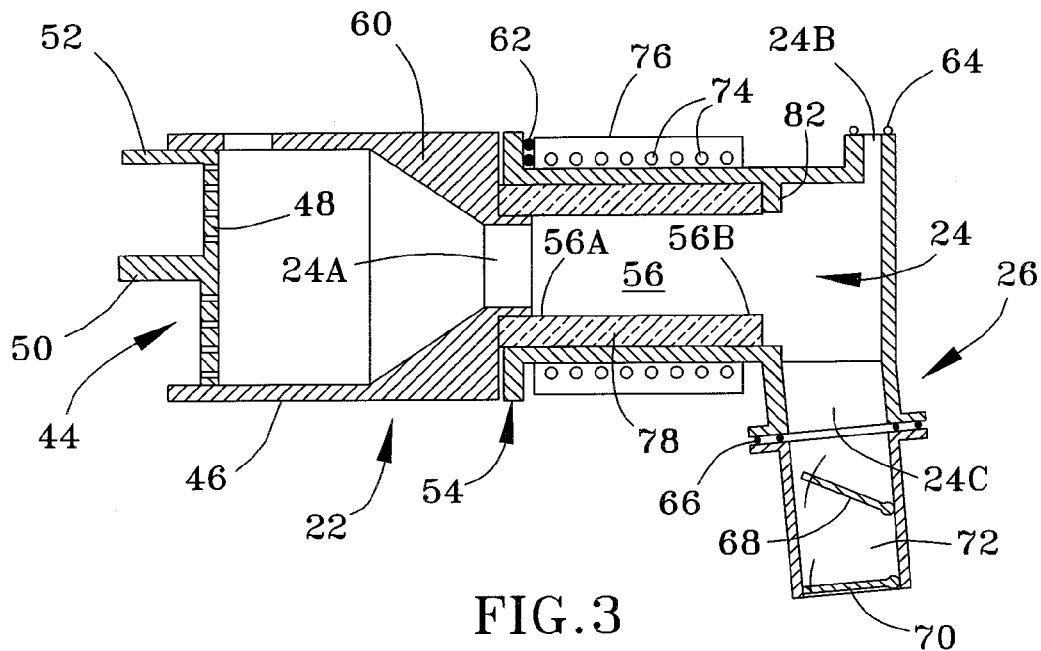
FIG. 3 is a more detailed view of a biomass compaction unit, reactor unit, and ash removal unit of the biomass gasification apparatus of FIGS. 1 and 2.

The ash removal unit 26 periodically collects ash discharged from the reactor vessel 54 as a result of the action of the ram 44 on incoming biomass material 20, optionally with the assistance of gravity as discussed below with reference to FIG. 3. The ash removal unit 26 may utilize a variety of equipment and technologies for safely and efficiently handling the ash byproduct of the pyrolysis process. Particular examples include rotary valves and double dump (double flap) valves. A drawback of the use of a rotary valve is that grit in the ash may cause excessive wear. A preferred valve system is believed to be a double dump valve as represented in FIG. 3, which as known in the art makes use of two separate doors 68 and 70. In a typical operation of a double dump valve, the upper door 68 is held closed until a sufficient mass of ash rests on the door 68 to overcome a counterweight (not shown), causing the door 68 to swing open and dump the ash into a dump chamber 72 between the doors 68 and 70. The upper door 68 is then closed, after which the lower door 70 can be cycled to remove the ash from the chamber 72 and, consequently, the ash removal unit 26. Alternately, the valve can be cycled automatically in response to other parameters. For example, the cycle of the double dump valve may be preset to a certain number of cycles per unit time, or automatically triggered based on one or more input variables. The integrated gas flow rate through the pump 32 might also be used as an input, since there will be a substantially linear correlation between syngas flow and ash production. Other variables that may contribute to an efficient cycle may include the force required to move the ram 44, the power delivered to the reactor vessel 54, the pressure within a discharge plenum 58 downstream of the vessel 54, or the weight of biomass placed in the hopper 21. With each of these approaches, ash can be removed from the reactor unit 24 with minimal loss of syngas by appropriately controlling the operation of the doors 68 and 70.

The ash produced by the pyrolysis process contains the mineral portion of the original biomass material 20. The PHYLLIS database for biomass and waste (The Energy Research Centre of the Netherlands; http://www.ecn.nl/phyllis) indicates that dry ash obtained from corn stover (stalks, cobs, and husks) is likely to constitute about 5% of the original biomass material 20 and comprise, by weight, about 50% silica ($SO_2$), about 30% phosphorus and potassium compounds, and about 9% lime (calcium oxide; CaO). As such, the ash can be returned to the fields using a manure spreader or similar device to nourish the next season's crops and enhance future biomass production.

The ash may possibly include some amount of potassium silicate, arising from the high temperature reaction of potassium-bearing molecules with silica present in the biomass material 20. Potassium silicate is a glassy material that is likely to be molten at the pyrolysis temperatures within the reactor vessel 54. Partially for this reason, the chute 46 and reactor vessel 54 may be inclined to promote the movement of the biomass material 20 and ash through the reactor chamber 56 under the influence of gravity. An incline of up to about thirty degrees from horizontal is believed to be sufficient to promote the flow of any viscous glassy material from the chamber 56, and cause the glassy material to exit the reactor unit 24 through an ash port 24C and then fall toward the center of the ash removal unit 26 so as to reduce the likelihood of the glassy material agglomerating on or near ash seals 66 between the reactor unit 24 and the removal unit 26. FIG. 3 further depicts the common axis of the ash port 24C and the ash removal unit 26 as being disposed at an oblique angle to the axis of the reactor vessel 54. This angle, which is preferably greater than 90 degrees to about 120 degrees, reduces the likelihood of any slag pouring down the side walls of the ash port 24C and contaminating the seals 66. A drip lip (not shown) may also be included for this purpose.

Figure 4:
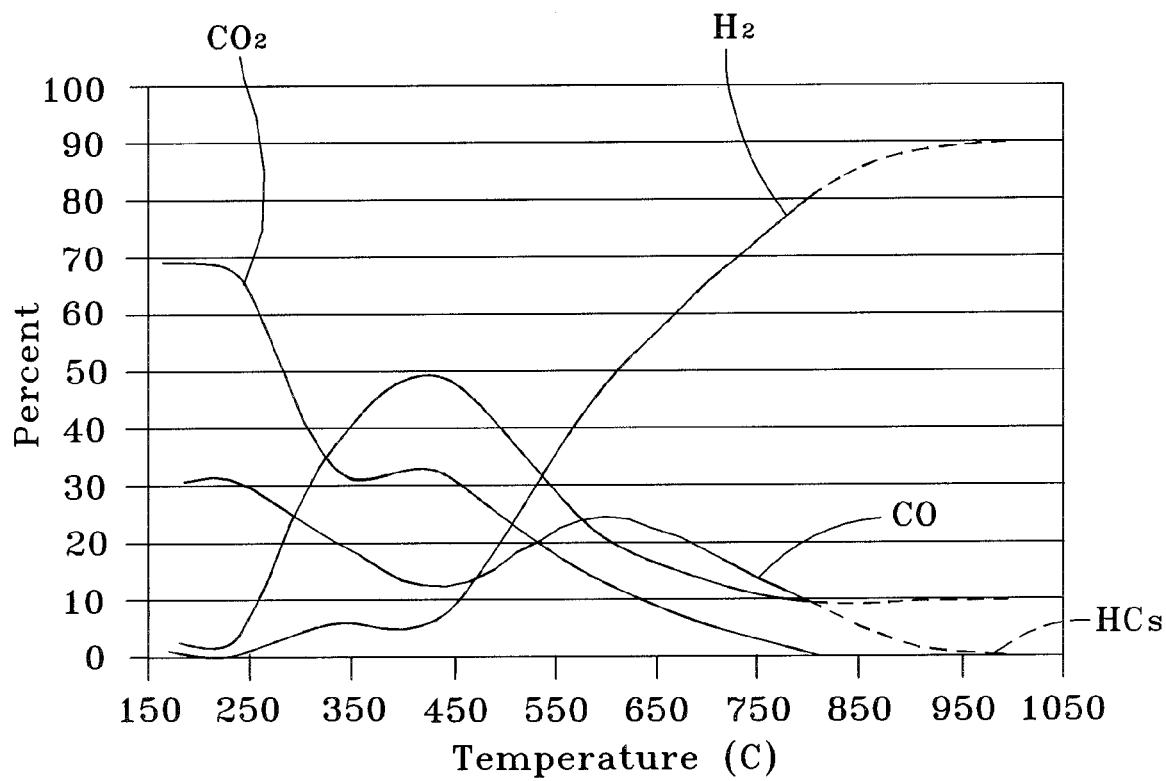
FIG. 4 is a graph plotting syngas compositions resulting from the pyrolysis of biomass materials relative to temperature.

The composition of pyrolysis gasses is a strong function of temperature. FIG. 4 is a plot of gas composition data obtained from studies in which syngases were produced at various pyrolysis temperatures up to about 800° C. (solid lines). FIG. 4 also plots nonlinear extrapolated data (dashed lines) at temperatures above 800° C. to about 1000° C. The most desirable component of syngas is hydrogen, which has a much higher heating value (142 MJ/kg) than carbon monoxide (10.8 MJ/kg). From FIG. 4, it is evident that higher pyrolysis temperatures favor the production of hydrogen over carbon monoxide, with the syngas composition containing up to about 90 volume percent of hydrogen and about 10 volume percent or more of carbon monoxide at temperatures of about 950° C. and higher. Empirical data obtained thus far suggest that the hydrogen content may be in a range of about 35 to about 95 volume percent, and the carbon monoxide content may be in a range of about 10 to about 65 volume percent. An additional benefit is the reduced fraction of higher molecular weight hydrocarbons (HCs) at temperatures above 800° C., and particularly at temperatures above about 950° C. where hydrocarbons are believed to be present in trace amounts and syngas is believed to consist essentially of hydrogen and carbon monoxide. This aspect of the pyrolysis process of this invention is notably advantageous because aromatic hydrocarbons and alkanes are undesirable components of syngas and known to pose human health hazards. In conventional gasification processes, these compounds are present and therefore must be scrubbed or chemically removed from the syngas. In the present invention, with the use of higher pyrolysis temperatures in a low oxygen or substantially oxygen-free atmosphere, these hazardous compounds are believed to break down into simpler elements with high heating values, reducing or eliminating the need for post-processing of the syngas prior to combustion in, for example, the combustion apparatus 40 of FIG. 1. While not wishing to be limited, it is believed that a preferred temperature range for the pyrolysis process of this invention is about 950° C. to about 1275° C.

Figure 5:
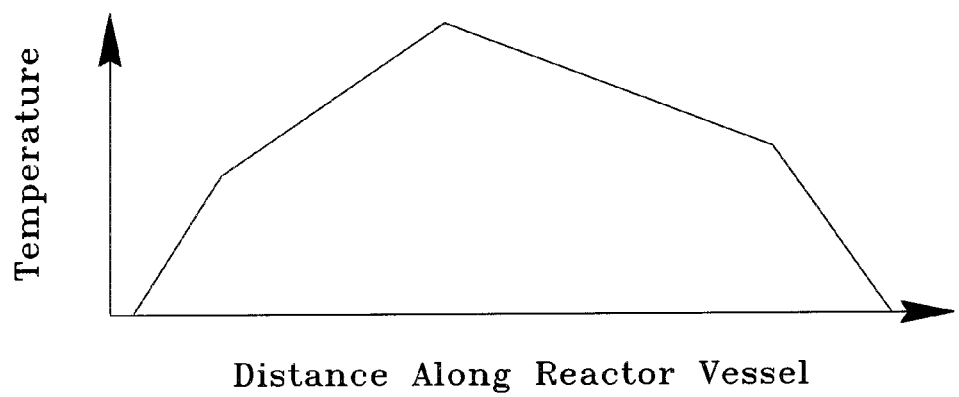
FIG. 5 is a graph plotting a temperature profile suitable for a reactor vessel of the biomass gasification apparatus represented in FIGS. 1 through 3.

It should be noted that the temperature within the syngas reactor chamber 56 is not necessarily uniform. For material compatibility with seals 62, 64, and 66 located at the entrance 24A and exit ports 24B and 24C of the reactor unit 24, it is advantageous for the temperatures at the entrance end 56A and exit end 56B of the chamber 56 to be relatively cooler than at the center of the chamber 56. FIG. 5 depicts one of the various temperature profiles possible for the vessel 54.

The pyrolysis process performed within the reactor unit 24 is a far more efficient use of biomass energy than combustion. For example, when burned corn stover has a lower heating value (LHV) of about 14 kJ/kg. However, when converted anaerobically to syngas and used in a combined heat and power (CHP) application (as represented in FIG. 1), the higher heating value (HHV) is much higher: 76 kJ/kg. It is therefore important to minimize the amount of oxygen present within the reactor unit 24 and the biomass material 20 introduced into the reactor unit 24, so that more of the energy is available as syngas instead of combustion. It is also important to heat the biomass material 20 efficiently, so that pyrolysis requires less energy than the difference between stover combustion and syngas combustion.

To accomplish the above, the reactor unit 24 is preferably configured to heat the biomass material 20 indirectly, in other words, the source of heat does not contact the biomass material 20, but instead heat from a heat source passes through an intermediate material that is preferably capable of diffusing and uniformly distributing the heat to the biomass material 20. According to a preferred aspect, indirect heating of the biomass material 20 is achieved by partly closing the vessel 54 (FIGS. 2 and 3) in which pyrolysis is performed, and conducting heat through the walls of the vessel 54. According to another preferred aspects of the invention, the vessel 54 has a substantially cylindrical exterior shape and the reactor chamber 56 defined by the interior of the vessel 54 also has a substantially cylindrical shape. Furthermore, the reactor unit 24 is configured to exclude air from the reactor chamber 56, and the introduction of air into the chamber 56 is minimized by compressing the biomass material 20 with the ram 44 and ram-feeding the compressed biomass material 20 into the chamber 56 to effectively block the inflow of air into the chamber 56 at the entrance of the vessel 54. The degree of compaction achieved with the ram 44 can be adjusted by the ram stroke and force settings. The aforementioned ash seals 66 and double dump valve of the ash removal unit 26 are also adapted to provide an effective seal from air ingress into the reactor chamber 56. To reduce the risk of contaminating the syngas, it may be desirable to halt the ram 44 and allow hot biomass to complete its gasification (a few seconds) before cycling the ash removal unit 26. Ash can then be removed and the process re-started.

As noted above, the ram 44 preferably operates to eliminate most of the air from the biomass material 20, and the resulting compacted biomass material 20 significantly reduces the amount of air that is able to enter the reactor chamber 56 through the entrance of the reactor vessel 54. The compacted biomass material 20 at the entrance to the vessel 54 also prevents the escape of syngas produced from the pyrolysis reaction. Instead, the syngas is vented from the reactor chamber 56 through a syngas port 24B (FIG. 3) and into the discharge plenum 58 and optionally a heat exchanger, where the syngas may be cooled before being compressed for storage or immediate use.

According to an optional aspect of the pyrolysis process, the reactor vessel 54 can be configured or equipped to increase the residence time of the syngas at a temperature sufficient to breakdown any high molecular weight compounds (for example, hydrocarbons) in the syngas into simpler molecules such as hydrogen and carbon monoxide. Means to increase residence time can involve any one or more techniques within the knowledge of those skilled in the art, including a porous membrane (such as an insert 78 discussed in reference to FIG. 3 below), a tortuous path, a plurality of small inner diameter tubes, or a set of baffles between the reactor chamber 56 and the syngas port 24B. Devices adapted to increase the residence time in the syngas and break down high molecular weight compounds should not impede the movement of ash from the chamber 56, through the ash port 24C, and into the ash removal unit 26.

FIG. 3 schematically shows additional details of the ram 44, feeder chute 46, and reactor vessel 54 that are believed to promote their cooperative operation. As shown in FIG. 3, the feeder chute 46 is interconnected with the reactor vessel 54 through a transition block 60. The block 60 is preferably formed of a refractory material that is thermally stable, resistant to hydrogen embrittlement, and exhibits good wear resistance to the biomass material 20. One such material is rhenium, though the cost of rhenium may prompt the use of other refractory materials, including superalloys, or the use of a refractory coating on a relatively low-cost material. As its name implies, the transition block 60 provides a transition between the feeder chute 46 and the interior chamber 56 of the reactor vessel 54. For this purpose, the transition block 60 is preferably tapered to promote compression of the biomass material 20 and inhibit syngas within the chamber 56 from backstreaming out through the chute 46. The transition block 60 also provides a thermal barrier between the heated reactor vessel 54 and the feeder chute 46, and provides a solid surface against which the reactor vessel 54 can be sealed.

The reactor vessel 54 is necessarily formed of a refractory material, such as quartz used in the semiconductor industry for wafer furnaces. Other materials that may be used include silicon carbide, aluminum oxide (corundum), or other non-porous refractory ceramic. Refractory metals or alloys which are not embrittled by hydrogen may also be used, such as rhenium or a superalloy such as one of the Hastelloy or Inconel alloys. Coatings of one or more refractory materials on a lower-cost refractory substrate may also be used for the reactor vessel 54. FIG. 3 represents the reactor vessel 54 as containing a ceramic insert 78, shown as held in place within the chamber 56 by a lip 80 defined by the transition block 60 and a stop 82 defined by the reactor vessel 54. The ceramic insert 78 is preferably adapted to perform certain desirable functions. First, the insert 78 provides a surface upon which the biomass material 20 can go through its transformation from organic vegetative matter to ash and syngas, including intermediate steps involving tars or paraffins, without directly contacting or contaminating the reactor vessel 54. Furthermore, the insert 78 may be advantageously doped with a catalyst and formed to have a porous wall structure such that tars, alkanes, and high molecular weight hydrocarbons are efficiently converted to hydrogen and carbon monoxide, the primary constituents of syngas. Suitable catalysts include noble metals such as platinum or palladium, base metals such as iron or nickel, and other catalytic materials known to those skilled in these arts. The catalyst can be incorporated in the matrix of the ceramic insert 78 during its fabrication, or applied after the insert 78 is formed to maximize the surface area available for catalytic reactions. Another desired function of the insert 78 is to promote the flow of syngas away from the gasification reaction front by diffusion of the gasses through the porous wall structure of the insert 78. In this way, large hydrocarbon molecules have a longer residence time at the gasification front, enabling a more complete decomposition into syngas.

Figure 6:
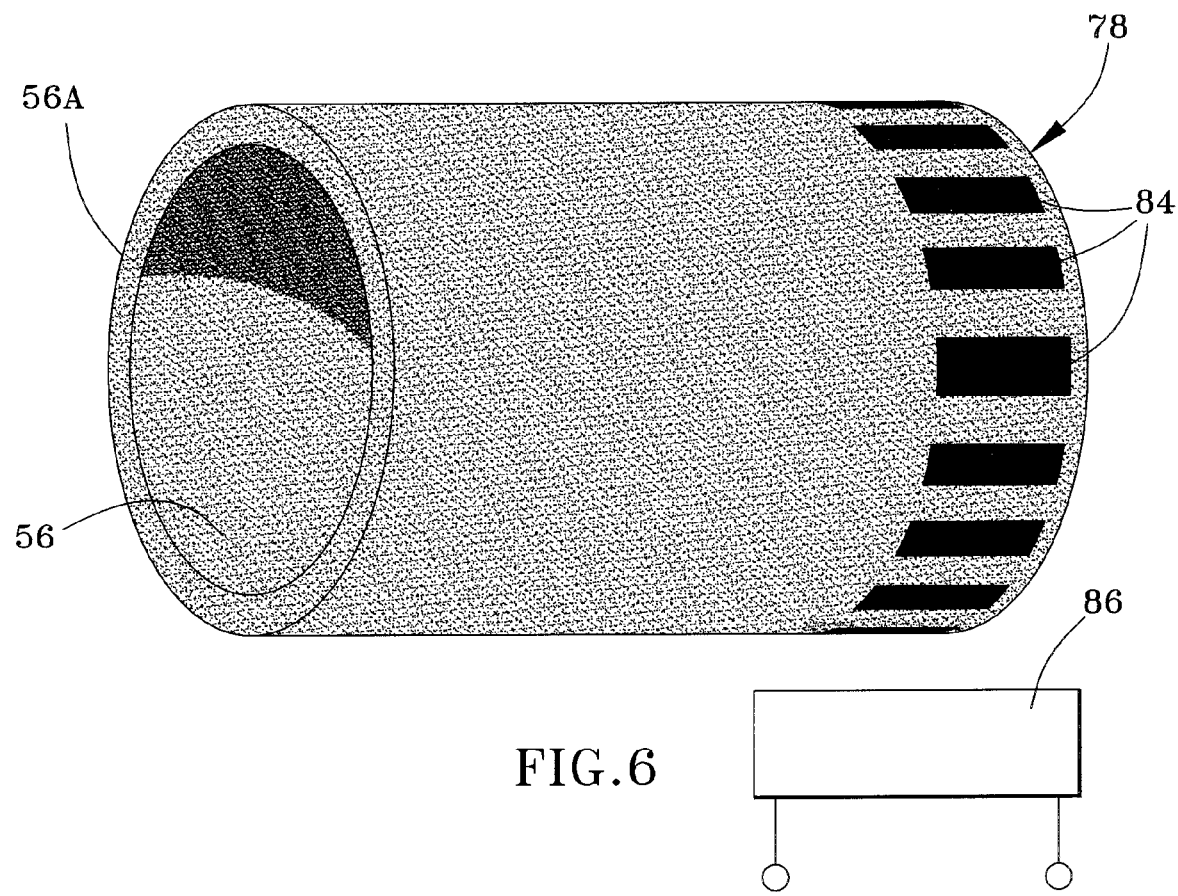
FIG. 6 is a further detailed view of an insert for the reactor unit of FIGS. 1 through 3.

Yet another desired function of the insert 78 is to serve as a means for facilitating the movement of ash toward the ash port 24C. By embedding a magnetizable material 84 within or on the insert 78 as represented in FIG. 6, an electromagnet 86 can be employed to induce an external magnetic field that shakes or vibrates the insert 78, thereby encouraging the ash to move towards the ash port 24C where it can be removed via the removal unit 26. If, as previously discussed, the reactor vessel 54 is inclined from the horizontal so that the exit 56B of the vessel chamber 56 is lower than its entrance 56A, the ceramic insert 78 will likewise be inclined. In combination with vibration, such an inclined orientation of the insert 78 further promotes the movement of ash toward the ash port 24C. Alternatively or in addition, an incline on the interior surface of the insert 78 can be accomplished by a taper in the wall thickness of the insert 78, or by tilting the insert 78 within the reactor vessel 54. As discussed for the vessel 54, an inclination angle of up to about thirty degrees is believed to be adequate. An inclination angle of greater than sixty degrees is believed to be undesirable as it increases the risk that some biomass material 20 may fall through the hottest central zone within the reactor chamber 56 and settle near the cooler lower end of the vessel 54, reducing the likelihood that the biomass material 20 will be completely gasified.

As previously noted, the reactor vessel 54 is equipped with three gas-tight seals 62, 64 and 66 located at the entrance 24A and exit ports 24B and 24C of the reactor unit 24. In addition to the aforementioned ash seals 66 between the reactor unit 24 and the ash removal unit 26, an inlet seal 62 is provided between the transition block 60 and the vessel 54, and an outlet seal 64 is located at the syngas exit port 24B of the reactor unit 24. Suitable materials for the inlet seal 62 include high-temperature sealing compounds such as Copaltite® (National Engineering Products, Inc.) on fluoropolymer elastomer (for example, Viton®) o-rings, or possibly a metal-to-metal seal such as the H-seal™ available from Bostech Engineering. Because of lower temperatures, various conventional seal materials can be employed for the outlet and ash seals 64 and 66 at the ports 24B and 24C of the reactor unit 24. The syngas exit port 24B is preferably positioned inline with the ash port 24C so that any ash clogging the ash port 24C can be removed by access through the syngas exit port 24B.

As noted above, the reactor chamber 56 is preferably heated using an indirect heating technique. A number of indirect heating methods are available and believed to be capable of efficiently pyrolyzing biomass materials, including, but not limited to, plasma flame heating, resistive heating, radiant heating (e.g., with lamps), and electromagnetic heating (e.g., with microwaves). Plasma flame requires an electric power source, which may come from the facility's utilities feed, though with a modest amount of electrical energy storage (batteries, ultracapacitors, or electrolyzed hydrogen plus a fuel cell) a plasma flame-heated biomass reactor can be operated entirely autonomously. Plasma flame torches can generate ion temperatures as high as about 15,000° C., making this indirect heating technique a potentially highly-efficient process for indirect biomass heating. Heat from a plasma flame that is not absorbed by the reactor vessel 54 can be captured and used elsewhere at the facility.

A challenge encountered when heating the reactor vessel 54 with a plasma flame is to uniformly heat the vessel 54 and avoid thermal stresses that can limit component life. Various possible approaches exist for evenly distributing heat to the vessel 54, including the use of a motile plasma flame head. For example, a motile plasma flame head could be raster scanned across the exterior surface of the vessel 54 to reduce thermal gradients. Because the flame from a plasma torch is predominantly cylindrical in shape, multiple torch heads would likely be needed to heat the entire length of the reactor vessel 54. Because the buoyant heat from a torch rises, the torches would likely be concentrated at the lowest portion of the vessel 54. Producing a more uniform temperature distribution around the vessel 54 can be further promoted by configuring the vessel 54 as a heat pipe. As known in the art, heat pipes have a hollow interior filled with two phases of a substance, such as liquid mercury and mercury vapor. The vapor phase is driven away from hotter regions of the heat pipe and recondenses at cooler regions of the heat pipe. By forming the reactor vessel 54 to have a hollow space within its walls, an annular-shaped heat pipe can be effectively formed that is capable of transferring heat from a plasma torch to other regions of the vessel 54.

FIGS. 2 and 3 schematically represent resistive heating elements 74 as another technique of particular interest for indirect heating of biomass material 20 within the reactor vessel 54. Resistive heating technology is relatively simple and well understood, and tube-shaped resistive furnaces are commercially-available and can be readily adapted for use in pyrolysis processes of this invention. A resistively-heated syngas reactor would be relatively convenient, low-cost, and safe to operate in a wide variety of installations. An external source of electric power or an on-site electricity storage device can be employed to power a resistive furnace and achieve higher energy efficiency than conventional gasification processes that involve combustion of a biomass.

Because the exterior of the reactor vessel 54 is heated to provide indirect heating of the biomass material 20 within the chamber 56, a heat shield 76 (FIG. 3) is preferably provided that surrounds the vessel 54 and the heating elements 74 to concentrate the heat toward the chamber 56, reduce heat loss, and minimize heating of surrounding components. The heat shield 76 may be formed from one or more layers of reflective materials, such as dimpled tungsten foil, specular gold- or chrome-plated metal reflectors, or a refractory ceramic brick material. A fibrous material may also be used, including asbestos or a ceramic fiber material such as Fibrefrax commercially available from various sources.

In many cases, it will be desirable for the system 10 to be capable of semi-autonomous operation. For this reasons, various sensors may be included, such as hydrogen and/or carbon monoxide detectors, temperature sensors, and position sensors to ensure that the system 10 is intact and able to operate as intended. The system 10 can include a controller (not shown) capable of shutting down the system 10 under appropriate circumstances, such as excess gas leakage, excessive temperatures, combustion, or lack of seal engagement. Such a controller may also monitor the ram 44 to sense ram force, position and speed, whose feedback can be used to determine if the biomass feedstock has diminished. As evident from the previous discussion, a sufficient biomass feedrate is desired to prevent syngas backstreaming through the entrance to the reactor vessel 54 and to prevent unwanted combustion within the reactor chamber 56. As a particular example, a strain gauge can be located on the ram pusher plate 48 or push rod 50 to sense force when the biomass is being compacted, which in the absence of biomass will produce a much lower output. If the output of the strain gage drops below a threshold level corresponding to insufficient biomass material 20 at the entrance 56A to the reactor chamber 56, the controller can shut down the ram 44. As another example, hydraulic pressure within a hydraulic system operating the ram 44 can be monitored to ensure that the hydraulic fluid pressure rises to a threshold level at full ram extension, corresponding to increased reaction force from the compacted biomass material 20. A great many other systems and sensors can be used to sense the presence, location, and condition of the biomass material 20, pressure within the syngas reactor unit 24, flow rate of syngas through the filtration unit 30 and pump 32, etc., which will be evident to those skilled in the art.

While the invention has been described in terms of specific embodiments, it is apparent that other forms could be adopted by one skilled in the art. For example, the physical configuration of the system 10, the gasification apparatus 12, and their various components could differ from that shown, and materials and processes other than those noted could be used. Therefore, the scope of the invention is to be limited only by the following claims.

The invention claimed is:

1. A process of producing syngas from biomass materials, the process comprising:
    compacting a loose biomass material to remove air therefrom and form a compacted biomass material;
    introducing the compacted biomass material into a vessel of a reactor;
    heating the compacted biomass material within the vessel of the reactor in the substantial absence of air so as not to combust the compacted biomass material, the compacted biomass material being heated to a temperature at which organic molecules within the compacted biomass material break down to form ash and gases comprising carbon monoxide and hydrogen gas;
    diffusing the gases through a porous wall during the heating step, wherein relatively higher molecular weight hydrocarbons within the compacted biomass material have an increased residence time during the heating step to promote decomposition thereof into the gases;
    releasing the carbon monoxide and hydrogen gas from the reactor; and
    removing the ash from the reactor.

2. The process according to claim 1, wherein the heating step is performed at a temperature of about 950° C. or higher.

3. The process according to claim 1, wherein the heating step comprises indirectly heating the compacted biomass material through a wall of the reactor.

4. The process according to claim 3, wherein the heating step is performed by a technique chosen from the group consisting of plasma, resistive, electromagnetic, and radiant heating.

5. The process according to claim 1, wherein the vessel of the reactor comprises a cylindrical-shaped interior chamber, the biomass material is compacted as it is introduced into the vessel at a first end thereof, and the ash leaves the vessel at an oppositely-disposed second end thereof.

6. The process according to claim 5, wherein the compacted biomass material closes the first end of the vessel to inhibit the entry of air into the vessel.

7. The process according to claim 5, wherein the first and second ends of the vessel are at a lower temperature than an intermediate region within the vessel between the first and second ends of the vessel.

8. The process according to claim 5, wherein the ash is removed from the reactor through a passage having an axis of greater than 90 degrees and up to about 120 degrees from an axis of the vessel.

9. The process according to claim 1, wherein the vessel contains a catalyst that promotes the conversion of the higher molecular weight hydrocarbons to carbon monoxide and hydrogen gas.

10. The process according to claim 5, wherein the vessel is inclined so as to slope downward up to about sixty degrees from the first end to the second end thereof.

11. The process according to claim 1, wherein the reactor comprises an insert that defines the porous wall.

12. The process according to claim 11, further comprising inducing an external magnetic field to shake or vibrate the insert and thereby encourage removal of the ash from the reactor.

13. The process according to claim 1, the process further comprising passing the gases through a porous membrane, a tortuous path, a plurality of tubes, or baffles while subject to the heating step.

14. The process according to claim 1, further comprising extracting heat from the gases after the gases are released from the reactor.

15. The process according to claim 1, wherein the hydrogen gas constitutes about 35 to about 95 volume percent of the gases.

16. The process according to claim 1, wherein the carbon monoxide gas constitutes about 10 to about 65 volume percent of the gases.

17. The process according to claim 1, wherein the gases consist essentially of the hydrogen and carbon monoxide gases.

18. The process according to claim 1, further comprising delivering the gases to a combustion apparatus and powering a generator with the combustion apparatus to generate electricity.

19. The process according to claim 1, wherein the biomass material is chosen from the group consisting of agricultural, forestry, industrial and municipal byproducts and waste materials.

* * * * *